United States Patent
Sadarangani

(10) Patent No.: US 7,325,637 B2
(45) Date of Patent: Feb. 5, 2008

(54) HYBRID DRIVE DEVICE

(75) Inventor: Chandur Sadarangani, Västerås (SE)

(73) Assignee: Carnelian Cordless LLC, Las Vegas, NV (US)

( * ) Notice: Subject to any disclaimer, the term of this patent is extended or adjusted under 35 U.S.C. 154(b) by 176 days.

(21) Appl. No.: 10/362,737

(22) PCT Filed: Aug. 29, 2001

(86) PCT No.: PCT/SE01/01825

§ 371 (c)(1),
(2), (4) Date: Aug. 1, 2003

(87) PCT Pub. No.: WO02/20294

PCT Pub. Date: Mar. 14, 2002

(65) Prior Publication Data

US 2004/0026143 A1 Feb. 12, 2004

(30) Foreign Application Priority Data

Aug. 30, 2000 (SE) .................................... 0003051

(51) Int. Cl.
*B60K 1/00* (2006.01)
(52) U.S. Cl. .................. 180/65.3; 310/103; 310/80; 464/29
(58) Field of Classification Search ............. 180/65.1, 180/65.2, 65.3, 65.4, 65.5, 65.6, 65.7, 65.8; 310/103, 104, 105, 80; 464/29
See application file for complete search history.

(56) References Cited

U.S. PATENT DOCUMENTS

| | | | | |
|---|---|---|---|---|
| 3,789,281 A | * | 1/1974 | Shibata | 318/696 |
| 4,959,578 A | * | 9/1990 | Varga | 310/268 |
| 5,442,250 A | | 8/1995 | Stridsberg | |
| 5,801,473 A | | 9/1998 | Helwig | |
| 6,373,160 B1 | | 4/2002 | Schrödl | |
| 6,809,453 B2 | * | 10/2004 | Narita et al. | 310/216 |

FOREIGN PATENT DOCUMENTS

| | | |
|---|---|---|
| EP | 0240204 | 10/1987 |
| EP | 0588448 | 3/1994 |
| JP | 3015255 | 1/1993 |
| JP | 10271784 | 10/1998 |
| WO | 99/39426 | 8/1999 |
| WO | 00/34066 | 6/2000 |

* cited by examiner

*Primary Examiner*—Christopher P. Ellis
*Assistant Examiner*—John D Walters
(74) *Attorney, Agent, or Firm*—Woodcock Washburn LLP

(57) ABSTRACT

A hybrid drive device comprises an internal combustion engine and an energy converter adapted to co-operate with an output shaft of the internal combustion engine and which comprises an electric machine. The electric machine includes a first rotor connected to the output shaft of the internal combustion engine and a second rotor connected to a drive shaft. The two rotors are arranged with surfaces for co-operation by transmitting power through magnetism directed substantially in the direction of the axis of rotation of the rotors for substantially axial magnetic flux between the rotors.

29 Claims, 2 Drawing Sheets

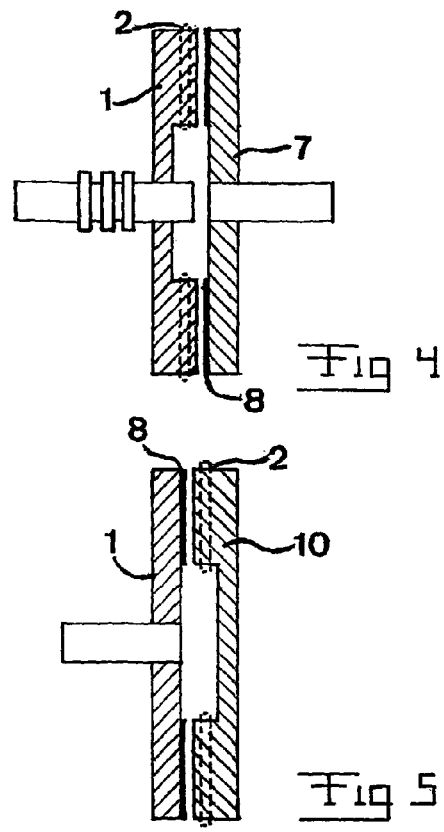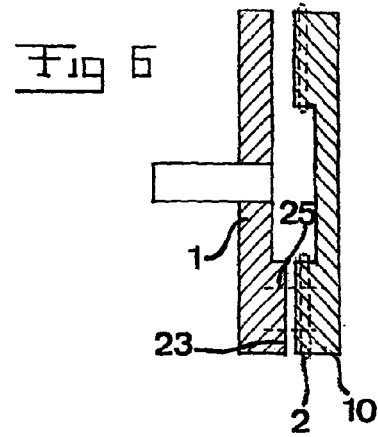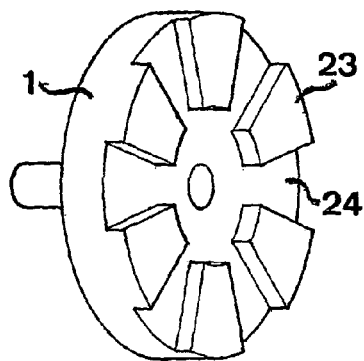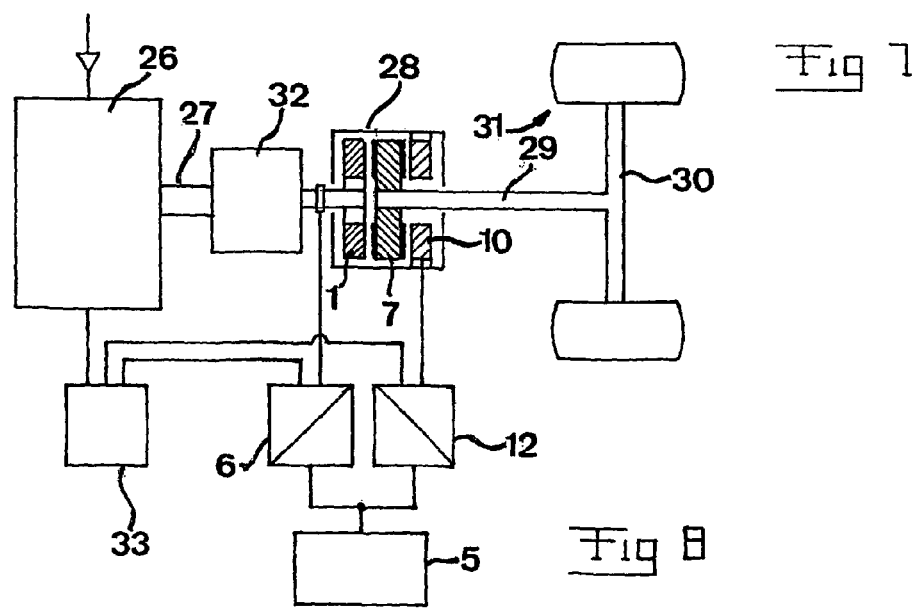

HYBRID DRIVE DEVICE

FIELD OF THE INVENTION AND PRIOR ART

The present invention relates to a hybrid drive device "Electric machine" is defined in such a way that it is also comprised that a co-operation by transmitting power through magnetism may take place between more than two parts movable with respect to each other, which would in the technical field sometimes be considered as several electric machines, but it is here considered as one single electric machine. Thus, a so called double rotor machine with a stator is for example to be regarded as an electric machine falling under the definition according to the invention, although such a machine is sometimes considered to be two electric machines connected in series.

For a hybrid drive device, especially such arranged in the engine compartments of a motor vehicle, the space available for said energy converter is normally strongly restricted, especially in axial direction. The engine compartment of motor vehicles has normally a predetermined maximum volume, which for hybrid drive vehicles often may not be larger than for a vehicle driven only by an internal combustion engine. This means then that a very restricted volume is provided for arranging an electric machine to be a part in the hybrid drive device, so that it is very important that the electric machine is designed so that a torque per volume unit available being as high as possible is obtained.

In one type of electric machines possible to use in a hybrid drive device defined in the introduction the windings of one part, which may be a rotor or a stator, are achieved by so called distributed winding technique, which means that the conductors belonging to different phases are intermixed. This winding technique makes the coil ends large, i.e. they demand quite some space in radial direction, which results in a reduced axial surface for the portions of the first part, such as pole pieces of iron, conducting the axial magnetic flux and transmitting the power between the parts. It is namely the size of the surface of these portions directed axially that determines how great the torque is that may be transferred between the parts, and the torque and the area of the surface are in a substantially linear relation to each other. In a given maximum axial surface allowed to be occupied by said first part including the windings, which results from the maximum outer measure of the electric machine in the radial direction, the area for the torque transfer will accordingly be the smaller the more place the coil ends demand in the radial direction.

Another electric machine already known and possible in a hybrid drive device is a so called torus wound machine, which has the additional drawback that it, for an optimum utilization of material, requires that members for co-operating by transmitting power through magnetism, such as permanent magnets, are arranged on both sides of the stator of the machine, so that such an electric machine sometimes may require much too much place in the axial direction of the machine.

SUMMARY OF THE INVENTION

The object of the present invention is to provide a hybrid drive device of the type defined in the introduction, which solves the problem of the often small spaces available and still demands of considerable torques to transfer in such hybrid drive devices.

This object is according to the invention obtained by in such a hybrid drive device the electric machine of the energy converter has said two rotors arranged with surfaces for co-operation by transmitting power through magnetism directed substantially in the direction of the axis of rotation of the rotors for substantially axial magnetic flux between the rotors, that the windings of said one rotor are adapted to be connected to a multiple phase alternating voltage for generating axial magnetic flux, that these rotor windings are arranged in the form of poles being concentrically wound, i.e. with the windings intended for connection to different phases of said multiple phase alternating voltage separated from each other by being wound around different pole pieces of the rotor and carried out substantially in planes being substantially perpendicular to the axis of the rotor.

It is hereby obtained that a considerable torque may be transferred through the energy converter of the hybrid drive device in spite of a small space available therefore. The coil ends of the windings get a small extension in radial direction, so that the radial extension of the pole pieces conducting the magnetic flux, such as iron, may be made larger and the area of the axial surface for transferring torque may hereby be increased, so that the maximum transferable torque at a given radius of a casing surrounding the electric machine may be increased, i.e. the so called torque density gets higher.

It is here appropriate to mention that the U.S. Pat. No. 5,442,250 describes an electric machine having windings for the different phases wound around separate pole pieces, but it is here a question about a machine with radially directed magnetic flux between a rotor and a stator, so that that machine is of another type than the one used in the energy converter of the hybrid drive device according to the invention. Neither is it a part of a hybrid drive device. Accordingly, there is not the same problem of obtaining a maximum torque at a given radius as for the invention. The very goal with that particular division of the phase windings is instead to simplify the drive electronic of the electric machine. Furthermore, the windings are there carried out in planes being substantially in parallel with the axis of rotation of the rotor, i.e. substantially perpendicular to the plane in which the windings in the electric machine according to the invention are carried out.

According to a preferred embodiment of the invention the two rotors are adapted to form a reluctance machine with poles magnetically imprinted on the second of the rotors for increasing the reactance between the two rotors at the poles with respect to between these poles. The advantage obtained by this is that compared with the case of an arrangement of permanent magnets the iron losses are eliminated should there be any desire to achieve a rotation of the second part with respect to another part of the electric machine without transferring any power between these parts in any operation condition. Another advantage of a reluctance machine with respect to a permanent magnet machine is that no detectors of the position of the second part are needed in the reluctance machine case, since it will all the time be adapted to the first part.

According to another preferred embodiment of the invention said two rotors are adapted to be able to rotate with different numbers of revolutions, and the electric machine of the energy converter comprises also a stator adapted to co-operate with one of the rotors by transmitting power through magnetism. It is then advantageous that one of the rotors as well as the stator has said windings for co-operation by transmitting power through magnetism, so that a double axial machine with the winding according to the invention of these two parts and the advantages associated therewith with respect to a high torque density and an easy way to cool may be obtained in this way.

According to another preferred embodiment of the invention said windings are adapted to be connected to a three phase alternating voltage and the number of poles of said one rotor is a multiple of three. By this no special arrangements for obtaining 120 electrical degrees between the different phases are needed. The number of poles is preferably 6, 9, 12, or 18. An advantage of a lower number of poles is that a lower frequency of the alternating voltage is required for obtaining a determined number of revolutions of the electric machine, which keeps the eddy-current losses down, which increase with the frequency, but it is then instead necessary to renounce the torque density somewhat, since an increased number of poles would enable a lower number of winding turns around each pole and thereby a still smaller radial extension of the coil ends of the windings.

According to another preferred embodiment of the invention said windings are carried out around pole pieces formed by a package of thin superposed material layers having a high reactance. Such pole pieces, which are preferably made of electric sheets of iron, results in reduced eddy-current losses. The sheets should then extend in substantially the same plane as the magnetic flux lines therethrough, so that these experience a very thin surface. However, the eddy-current losses may be even more reduced if, according to another preferred embodiment of the invention, the windings are carried out around pole pieces formed by bound iron powder. It gets in this case possible to accept a higher frequency of the alternating voltage without having too high losses for that sake.

According to another preferred embodiment of the invention the energy converter comprises a unit adapted to be able to influence the torque of a drive shaft out from the energy converter without changing the number of revolutions of this shaft or changing the number of revolutions of the output shaft of the internal combustion engine, and the device comprises a regulating arrangement adapted to co-ordinate control of energy flows from the internal combustion engine, to or from the electric machine and said unit. A hybrid drive device designed in this way, except that it lacks an electric machine according to the present invention, is described in the Swedish patent application 9804261-7 of the applicant and has among others the advantage that it is possible to obtain a very high efficiency of the internal combustion engine, since the existence of said unit in combination with the electric energy converter gives an increased freedom to let the internal combustion engine operate at an optimum number of revolutions and torque, which also results in a possibility to keep the emissions from the internal combustion engine on a comparatively low level. Thus, it gets possible to influence the torque of the drive shaft without changing the number of revolutions of this shaft, which makes it possible to maintain an unchanged number of revolutions of the output shaft of the internal combustion engine in spite a change of the torque on the drive shaft when desired. Further reasons for designing a hybrid drive device in this way may be found in said Swedish patent application.

Said drive shaft is advantageously a drive shaft for driving a wheel axle of a wheeled vehicle, especially a car.

Further advantages as well as advantageous features of the invention appear from the following description and the other dependent claims.

BRIEF DESCRIPTION OF THE DRAWINGS

With reference to the appended drawings, below follows a description of preferred embodiments of the invention. In the drawings:

FIG. 4 is a simplified view corresponding to FIG. 1 of an electric machine used in an energy converter in a hybrid drive device according to a second preferred embodiment of the invention, FIG. 5 is a view corresponding to FIG. 4 of an electric machine used in an energy converter in a hybrid drive device according to a third preferred embodiment of the invention, FIG. 6 is a view corresponding to FIG. 4 of an electric machine used in an energy converter in a hybrid drive device according to a fourth preferred embodiment of the invention, FIG. 7 is a perspective view of the rotor of the electric machine according to FIG. 6, and FIG. 8 is a simplified view of a hybrid drive device according to a preferred embodiment of the invention.

DETAILED DESCRIPTION OF PREFERRED EMBODIMENTS OF THE INVENTION

Figure 1:
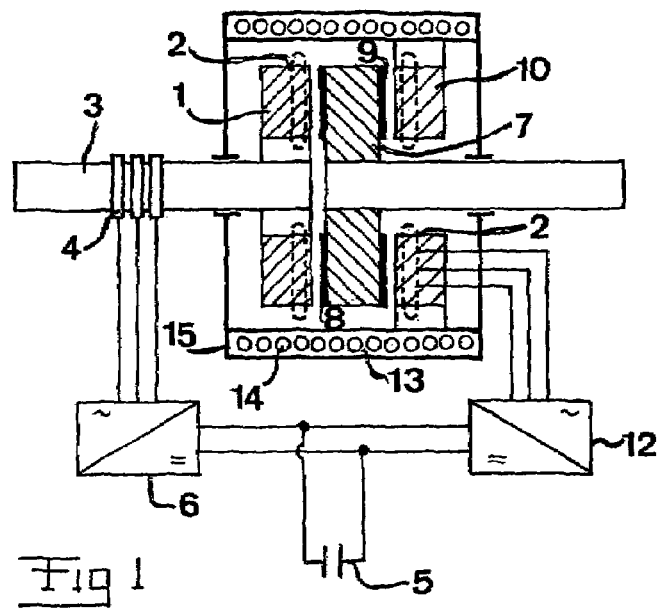
FIG. 1 is a partially schematical view illustrating an axial partial section through an electric machine used in an energy converter in a hybrid drive device according to a first preferred embodiment of the invention.

An electric machine used in an energy converter in a hybrid drive device according to a first preferred embodiment of the invention is schematically illustrated in FIG. 1, and it is also indicated how it may be built in in a hybrid drive device. It will be explained further below with reference to FIG. 8 how the rest of such a hybrid drive device may be realized and function.

Figure 2:
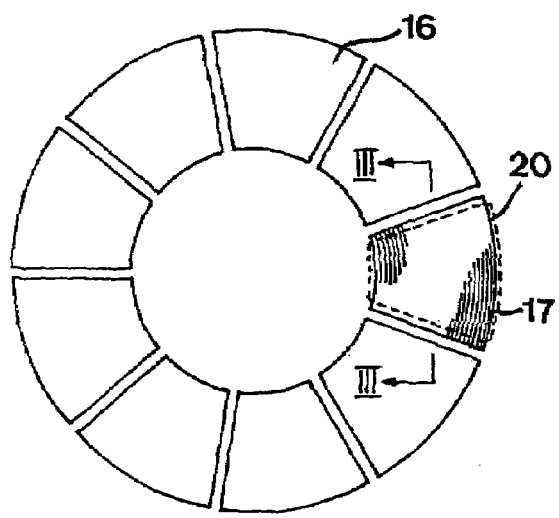
FIG. 2 is a detailed view of a part of the machine according to FIG. 1 in axial direction.

The electric machine has a first rotor 1, which has windings 2 schematically indicated applied around pole pieces in a way to be explained further below with reference to FIGS. 2 and 3. The windings 2 are through slip rings 4 running on the shaft 3 of the rotor connected to an energy source 5 schematically indicated, such as a battery, for receiving a three phase alternating voltage through a converter 6, for example a six pulse bridge.

The machine has also a second rotor 7, which is arranged coaxially with respect to the first rotor and on one side thereof has permanent magnets 8 facing towards axially directed surfaces of the first rotor with a small air gap therebetween for co-operation of the two rotors by transmitting power through magnetism. The second rotor 7 has on the other side thereof permanent magnets 9 directed oppositely axially and adapted to co-operate with a stator 10 by transmitting power through magnetism, said stator being constructed in the same way as the first rotor 1 with respect to the windings 2 and the connection to the energy source 5 through a converter 12. The rotors 1, 7 are rotatably received in bearings not shown while the stator 10 is stationary arranged by being fixed to a frame of the machine. The first rotor 1 may for example be connected through the shaft 3 thereof with the output shaft of an internal combustion engine, while the second rotor 7 may through the shaft thereof be connected to a drive shaft for for example wheels of a vehicle.

It is also shown how a casing 13 receiving the rotors and the stator is arranged. It is schematically illustrated how cooling loops 14 are built into the wall 15 of the casing for cooling those parts of the electric machine which get hot when transferring torque through magnetic flux directed substantially between the first rotor and the second rotor as well as between the second rotor and the stator. Gases as well as liquid cooling media, for example air or water, may be utilized in the cooling loops 14.

The very construction of the stator 10 will now be explained while making reference to FIGS 2 arid 3, and the first rotor 1 is constructed in the corresponding way. The stator has nine pole pieces 16 in the form of sector-shaped packages of thin sheets 17 (only shown for one pole piece) extending in planes being substantially in parallel with the rotation symmetry axis of the stator. It is shown in FIG. 3 how the sector-shaped pole pieces have slots 18 running substantially radially for receiving conductors 19 of the windings 2. The cross section of the slots are designed so that a winding having a sufficient cross section for obtaining a certain current without too high current density may be received in each slot.

The windings are concentrically carried out around the poles, i.e. one pole piece has only windings connected to one phase of said alternating voltage arranged therearound, so that the windings belonging to adjacent pole pieces are intended to be connected to different phases of the alternating voltage. More exactly, each third pole piece as seen in the circumferential direction of the stator is provided with windings connected to the same alternating voltage phase. This means that the coil ends 20 of the windings, which are only schematically illustrated for one pole piece in FIG. 2, may be given a very small extension in the radial direction of the stator, so that the pole pieces instead may be given a longer extension in the radial direction than if said coil ends would be thicker. The total surface of the pole pieces 16 axially directed may by this be increased, and it is the size of this surface that determines the amount of torque that may be transferred between the stator and the second rotor. This torque is namely transferred through the iron sheets through the magnet field formed therein through the alternating voltage in the windings 2 surrounding these. Through the co-operation of this magnet field with the permanent magnets 9 of the second rotor the latter may be driven to rotate.

Figure 3:
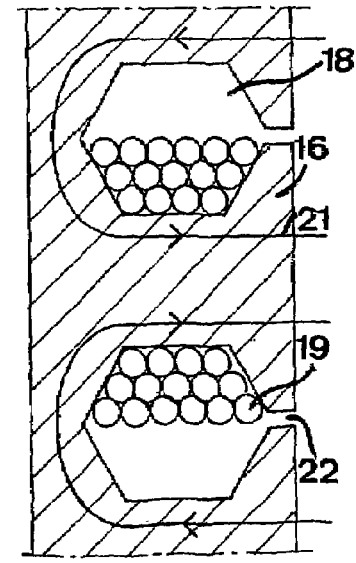
FIG. 3 is an enlarged view of a portion of the part shown in FIG. 2 in radial direction.

It is very schematically illustrated in FIG. 3 how magnet field lines 21 run through "the iron" 16 for leaving this in a substantially axial direction and then through the magnets 9 return for being closed in "the iron" 16.

It may as an example be mentioned that the pole width at the middle of each pole piece at the air gap may be 56.3 mm, while the thickness of the pole piece at the slots at the middle could be 28 mm. The opening 22 could then be 3 mm and 15 turns of a conductor with a conductor area of 25.5 mm$^2$ could then be wound around each pole piece. The inner diameter of the casing 13 could then be 260 mm, while the diameter of the inner ring formed by the pole pieces is 120 mm and the outer diameter of the outer ring 220 mm. Thus, the coil ends manage with a radial distance of 20 mm between the pole pieces and the casing.

The number of poles of the second rotor 9 is different than of the first rotor 1 or the stator 10. More exactly, it is in the three phase case in a relation of 2:3, 1:3, 1:4.5 and so on to the number of poles of the first rotor 1 and of the stator 10. It is in the present case six.

An electric machine used in an energy converter in a hybrid drive device according to a second preferred embodiment of the invention is very schematically shown in FIG. 4 and it differs from the one according to FIG. 1 by not having any stator, which also means that permanent magnets are only arranged on one side of the second rotor. The parts having correspondence in FIG. 1 have in this figure been provided with the same reference numerals.

An electric machine used in an energy converter in a hybrid drive device according to a third preferred embodiment of the invention is very schematically shown in FIG. 5 and it differs from the one according to FIG. 4 by the fact that the first rotor 1 is provided with permanent magnets and here the second rotor is replaced by the stator 10 having windings concentrically arranged around the poles thereof and it forms said first part. The parts having correspondence in FIG. 1 are in this figure provided with the same reference numerals.

An electric machine used in an energy converter in a hybrid drive device according to a fourth preferred embodiment of the invention is in FIG. 6 shown in a view corresponding to FIG. 4, and the parts corresponding to parts of the embodiment according to FIG. 1 are also here provided with the same reference numerals. There is no second rotor in this electric machine, but only two parts movable with respect to each other in the form of a first rotor 1 and a stator 10. The stator 10 constitutes here the first part, i.e. it is provided with the concentrical windings around the pole pieces, which are connected to the alternating voltage. Furthermore, this embodiment differs from the previous ones by the fact that the first rotor is provided with poles 23 being magnetically imprinted, so that the electric machine will be a synchronous reluctance machine. How this first rotor is designed appears more clearly from FIG. 7. Thus, the magnetic imprinting is here a physical imprinting by a shorter air gap of the poles 23 to the pole pieces of a stator than adjacent recess-like parts 24 of the rotor. However, the magnetic imprinting may be achieved by a pure material choice without any physical imprinting. The magnetic imprinted poles 23 are designed to increase the reactance between the stator 10 and the rotor 1 at the poles 23 with respect to between these poles by a smaller air gap there, so that a current in the stator windings will result in that a magnetic flux resulting therefrom (indicated by lines 25) will try to close through the iron of the rotor in the most easy way, i.e. where the air gap between the rotor and the stator is smallest, and if one pole is obliquely located with respect to the magnetic flux a torque is generated on the rotor, which tries to turn the pole into alignment with respect to the magnetic flux. This constitutes conventional technique for synchronous reluctance machines. The comparison of FIGS. 6 and 7 shows that the section in FIG. 6 is carried out in two planes making an angle to each other for illustrating the imprinting.

Finally, the principle of the hybrid drive device according to the invention and how a preferred embodiment thereof may be constructed is schematically illustrated in FIG. 8. The device comprises an internal combustion engine 26, which forms an input shaft 27 of an energy converter 28, which here is formed by an electric machine shown in FIG. 1. How this is constructed has already been described, and this is also valid for the energy source 5 with the converter 6, 12. It is here pointed out that the converter 6, 12 may also convert alternating voltage into direct voltage when feeding energy to the energy source 5 (a battery). It is also possible to feed energy between the converters.

The second rotor is connected to an output drive shaft 29, from the energy converter 28, which could receive a reduction of the number of revolutions in a reduction gear and by this transfer the rotation torque thereof to the wheel axle 30 of a wheeled vehicle 31 schematically indicated, such as a private car, a lorry or the like. However, a gear 32 may instead be arranged between the output shaft of the internal combustion engine and the first of the rotors, in which this gear then normally has the task to increase the number of revolutions of the internal combustion engine for reducing the difference in the number of revolutions between the two rotors. However, in the normal case the gear 32 will be located "after" the rotor. The device comprises also a regulating arrangement 33 schematically indicated adapted to co-ordinate control of energy flows to or from the internal combustion engine and the two electric machines.

It is a matter of course that an amount of different possibilities to combinations of energy flows are possible in such a hybrid drive device, and for a more exact description of the details thereof reference is made to the Swedish patent application 9804261-7 already mentioned. Thus, the drive shaft 29 may for example be driven through energy from only the internal combustion engine, only the battery 5 or both of them. It may as an example be mentioned that when driving with a so called "cruise control", i.e. with a constant speed when driving on a highway, the regulating arrangement may ensure that locking members not shown connect the output shaft of the internal combustion engine with the drive shaft, and the wheel axle is on an even ground driven substantially only by the internal combustion engine, and electrical energy is supplied to the stator from the battery 5 when suddenly driving uphill for giving a torque addition to the drive shaft and enable a constant speed there without changing the number of revolutions or the torque of the internal combustion engine. This way of driving on a highway means for the rest a charging of the battery, so that it will then be possible to disconnect the internal combustion engine and only drive with energy from the battery when driving in a city.

An advantage of an electric machine according to the invention in such a hybrid drive device is that a very high torque density may be obtained thanks to the axial magnetic flux and the way in which the windings are carried out, so that it will be possible to transfer high torques desired on the drive shaft 29 also when the vehicle is driven by energy only from the battery in spite of the very restricted space available for the electric machine.

The invention is of course not in any way restricted to the preferred embodiments described above, but many possibilities to modifications thereof will be apparent to a person with skill in the art without departing from the basic idea of the invention as defined in the claims.

The electric machine of the hybrid drive device according to the invention may for example have another number of parts movable with respect to each other than shown in the figures, for example more than three.

The number of poles of the rotor and/or stator could also be totally different. It is also theoretically conceivable that the number of phases of the alternating voltage in the windings carried out concentrically could be another than three, for example two, four or five, should there be a desire to do so.

The invention claimed is:

1. A hybrid drive device, comprising:
an internal combustion engine, an energy converter adapted to co-operate with an output shaft of the internal combustion engine and which comprises at least one electric machine having a first rotor connected to the output shaft of the internal combustion engine and a second rotor connected to a drive shaft, in which the rotors are adapted to co-operate with each other by transmitting power through magnetism, in which at least one of the rotors is provided with rotor windings, and in which the device comprises an energy source adapted to exchange electrical energy with said rotor windings through an alternating voltage in said rotor windings;
wherein the electric machine has said two rotors arranged with surfaces for cooperation by transmitting power through magnetism directed substantially in the direction of the axis of rotation of the rotors for substantially axial magnetic flux between the rotors; and wherein the rotor windings are adapted to be connected to a multiple phase alternating voltage for generating axial magnetic flux, wherein these rotor windings are arranged in the form of poles being concentrically wound, with the rotor windings adapted for connection to different phases of said multiple phase alternating voltage separated from each other by being wound around different pole pieces and carried out substantially in planes substantially perpendicular to said axis of rotation.

2. A device according to claim 1, wherein the second rotor is provided with permanent magnets for said cooperation by transmitting power through magnetism with said first rotor.

3. A device according to claim 1, wherein the first and second rotors are adapted to form a reluctance machine with poles magnetically imprinted on the second rotor for increasing the reactance between the two rotors at the poles with respect to between these poles.

4. A device according to claim 1, wherein said rotors are arranged to be able to rotate with different numbers of revolutions, and the electric machine of the energy converter further comprises a stator adapted to co-operate with one of the rotors by transmitting power through magnetism.

5. A device according to claim 4, wherein one of the rotors and the stator has said windings for cooperating by transmitting power through magnetism through substantially axial magnetic flux between each of them and the other rotor.

6. A device according to claim 1, further comprising a casing extending axially and surrounding said first and second rotors, and means for cooling the rotors arranged in the wall of the casing.

7. A device according to claim 1, wherein said rotor windings are adapted to be connected to a three phase alternating voltage and the number of poles of said at least one rotor is a multiple of three.

8. A device according to claim 7, wherein the number of poles is 6, 9, 12 or 18.

9. A device according to claim 1, wherein said windings are carried out around pole pieces formed by a package of thin superposed material layers having a high reluctance.

10. A device according to claim 1, wherein the windings are carried out around pole pieces formed by bound iron powder.

11. A device according to claim 1, wherein said windings are carried out around pole pieces having a substantially circular sector-like shape having each at least one slot extending substantially radially for receiving the windings.

12. A device according to claim 1, wherein the energy converter comprises a unit adapted to be able to influence the torque of a drive shaft out from the energy converter without changing the number of revolutions of this shaft or changing the number of revolutions of the output shaft of the internal combustion engine, and wherein the device further comprises a regulating arrangement adapted to co-ordinate control of energy flows from the internal combustion engine, to or from the electric machine and said unit.

13. A device according to claim 1, wherein said drive shaft is configured for driving a wheel axle of a wheeled vehicle.

14. An electric machine, comprising:
   a first rotor configured to be connected to an output shaft of an engine, said first rotor being adapted to cooperate with at least one of a second rotor and a stator by transmitting power through magnetism, said magnetism being effected by an axial magnetic flux directed substantially in a direction of an axis of rotation of said first rotor; and
   a plurality of rotor windings, said rotor windings being adapted to be connected to a multiple phase alternating voltage for generating said axial magnetic flux.

15. An electric machine as recited in claim 14, wherein said rotor windings are arranged in the form of poles concentrically wound on said first rotor, and wherein said at least one of a second rotor and a stator comprises a plurality of permanent magnets configured so as to face said windings across an air gap.

16. An electric machine as recited in claim 14, wherein said windings are arranged in the form of poles concentrically wound on said stator, and wherein said first rotor comprises a plurality of permanent magnets configured so as to face said stator across an air gap.

17. An electric machine as recited in claim 14, wherein said windings are arranged in the form of poles concentrically wound on said second rotor, and wherein said first rotor comprises a plurality of permanent magnets configured so as to face said windings across an air gap.

18. An electric machine as recited in claim 14, wherein said rotor windings are adapted for connection to different phases of said multiple phase alternating voltage, and are separated from each other by being wound around different pole pieces and carried out substantially in planes being substantially perpendicular to said axis of rotation.

19. An electric machine as recited in claim 14, further comprising an energy source adapted to exchange electrical energy with said windings.

20. An electric machine as recited in claim 19, further comprising a converter disposed between said energy source and said windings.

21. An electric machine as recited in claim 20, wherein said energy source comprises a battery and said converter is capable of converting a voltage output of said battery into said multiple phase alternating voltage.

22. An electric machine as recited in claim 21, wherein said converter is further capable of converting an alternating voltage provided by said windings into a DC voltage for charging said battery.

23. An electric machine as recited in claim 14, comprising said second rotor, said second rotor being configured to be connected to a drive shaft.

24. An electric machine as recited in claim 14, wherein said rotor windings are arranged in the form of a first set of poles concentrically wound on said first rotor, and wherein said at least one of a second rotor and a stator comprises a plurality of permanent magnets configured so as to face said windings across an air gap, said permanent magnets forming a second set of poles wherein the number of poles in said first set is equal to the number of poles in said second set.

25. An electric machine as recited in claim 13, wherein said rotor windings are arranged in the form of a first set of poles concentrically wound on said first rotor, and wherein said at least one of a second rotor and a stator comprises a plurality of permanent magnets configured so as to face said windings across an air gap, said permanent magnets forming a second set of poles wherein the number of poles in said first set is different from the number of poles in said second set.

26. An electric machine, comprising:
   a first rotor configured to be connected to an output shaft of an engine;
   a second rotor arranged coaxially with the first rotor; and
   a plurality of rotor windings of the first rotor, said rotor windings being adapted to be connected to a multiple phase alternating voltage for generating said axial magnetic flux;
   wherein the first rotor is adapted to cooperate with the second rotor by transmitting power through magnetism, said magnetism being effected by an axial magnetic flux directed substantially in a direction of an axis of rotation of said first rotor.

27. An electric machine as recited in claim 26, wherein the second rotor is provided with first permanent magnets facing towards axially directed surfaces of the first rotor for said cooperation by transmitting power through magnetism with said first rotor.

28. An electric machine as recited in claim 27, further comprising:
   a stator adapted to co-operate with one of the rotors by transmitting power through magnetism.

29. An electric machine as recited in claim 28, wherein the second rotor is located axially intermediate the first rotor and the stator, the second rotor being provided with second permanent magnets directed axially opposite the first permanent magnet, the second permanent magnets adapted to cooperate with the stator by transmitting power through magnetism.

* * * * *

UNITED STATES PATENT AND TRADEMARK OFFICE
CERTIFICATE OF CORRECTION

PATENT NO. : 7,325,637 B2  Page 1 of 1
APPLICATION NO. : 10/362737
DATED : February 5, 2008
INVENTOR(S) : Chandur Sadarangani It is certified that error appears in the above-identified patent and that said Letters Patent is hereby corrected as shown below:

Column 8,
Line 6, delete "cooperation" and insert -- co-operation --.

Column 8,
Line 21, delete "cooperation" and insert -- co-operation --.

Column 8,
Line 34, delete "cooperating" and insert -- co-operating --.

Column 9,
Line 5, delete "cooperate" and insert -- co-operate --.

Column 10,
Line 16, after "set of poles" and insert -- , --.

Column 10,
Line 28, delete "cooperate" and insert -- co-operate --.

Column 10,
Line 37, delete "cooperation" and insert -- co-operation --.

Column 10,
Line 49, delete "cooperate" and insert -- co-operate --.

Signed and Sealed this

Twenty-fourth Day of June, 2008

JON W. DUDAS
*Director of the United States Patent and Trademark Office*